(12) United States Patent
Gardner

(10) Patent No.: US 7,796,171 B2
(45) Date of Patent: Sep. 14, 2010

(54) SENSOR-BASED GAMMA CORRECTION OF A DIGITAL CAMERA

(75) Inventor: David W. Gardner, Colorado Springs, CO (US)

(73) Assignee: Flir Advanced Imaging Systems, Inc., Wilsonville, OR (US)

( * ) Notice: Subject to any disclaimer, the term of this patent is extended or adjusted under 35 U.S.C. 154(b) by 605 days.

(21) Appl. No.: 11/676,149

(22) Filed: Feb. 16, 2007

(65) Prior Publication Data
US 2008/0198246 A1 Aug. 21, 2008

(51) Int. Cl.
*H04N 5/202* (2006.01)
*H04N 5/20* (2006.01)
*H04N 5/335* (2006.01)
*H01L 27/00* (2006.01)
*B21F 9/00* (2006.01)

(52) U.S. Cl. .................. 348/254; 348/255; 348/294; 348/297; 250/208.1; 257/215

(58) Field of Classification Search ......... 348/296–299, 348/362–366, 254, 255, 294; 250/208.1; 257/215
See application file for complete search history.

(56) References Cited

U.S. PATENT DOCUMENTS

| 3,953,733 | A | * | 4/1976 | Levine | 250/330 |
| 6,486,503 | B1 | * | 11/2002 | Fossum | 257/215 |
| 7,020,353 | B1 | * | 3/2006 | McCaffrey et al. | 382/312 |
| 2002/0048837 | A1 | * | 4/2002 | Burke et al. | 438/48 |
| 2003/0128279 | A1 | * | 7/2003 | Suzuki | 348/221.1 |
| 2006/0220070 | A1 | * | 10/2006 | Izawa et al. | 257/239 |
| 2007/0051988 | A1 | * | 3/2007 | Koga | 257/239 |
| 2008/0164403 | A1 | * | 7/2008 | Hall et al. | 250/208.1 |

* cited by examiner

*Primary Examiner*—David L Ometz
*Assistant Examiner*—Quang V Le
(74) *Attorney, Agent, or Firm*—Haynes and Boone, LLP

(57) ABSTRACT

The anti-blooming structure of an image sensor is supplied with varying voltages during different integration periods such that charges generated in response to low level light are fully captured, whereas charges generated in response to a bright light spill over in a controlled manner. Accordingly, sensor's response may be generated to result in higher gains at low light levels and progressively lower gains at the higher light levels.

18 Claims, 3 Drawing Sheets

SENSOR-BASED GAMMA CORRECTION OF A DIGITAL CAMERA

BACKGROUND OF THE INVENTION

The present invention relates generally to imaging systems utilizing imaging sensors and more particularly to imaging systems with capability of periodically re-setting photosites and requiring a wide dynamic range within the same scene. Field of applications may cover a broad range of areas including but not limited to inspection and testing where imaging is used, digital x-ray systems, surveillance imaging applications, film scanning, night vision and automotive applications.

Typical scenes viewed by a camera may have a wide range of illumination conditions across the image. That is, the scene may have details in dimly lit areas that need to be resolved while simultaneously needing to resolve very bright areas of the scene without saturating the image sensor and camera system. Conventional film-based cameras are able to resolve the detail in both the dimly lit areas of a scene and brightly lit areas of the scene simultaneously because of the non-linear response of film emulsions. Digital cameras, however, have a highly linear response to light. This is both advantageous and disadvantageous. Linear response of a digital camera is frequently desirable in scientific imaging applications because post processing algorithms assume a linear response to light, but the range of information in a scene having very dimly lit and very brightly lit areas may exceed the linear range of the image sensor chip itself or the analog-to-digital converter (A/D) that is used to convert the information into computer readable information. If the gain of the sensor is reduced to avoid saturation in the high brightness area, details can be lost in the dimly lit areas. Conversely, if the gain is increased to capture the details in the dimly lit areas, the bright areas of the image will saturate, and image content is lost.

To achieve performance similar to that of a non-linear imaging device, such as a film-based camera, the linear nature of a digital imaging device thus must be transformed to a non-linear one. The transformation curve, or transfer function, that can correct the linear nature of a digital device closely follows an exponential function. The exponential value has been denoted by the symbol $\gamma$ by the imaging industry, and hence, the transformation curve is often referred to as the "gamma correction."

Typically, improved image display is achieved by post-processing the image after it is captured. Post-processing methods usually increase the gain in the dark areas (dim lighting) and decrease the gain in the bright areas, while applying a medium gain to areas between the two extremes. One common method uses a software gamma correction after the A/D converter converts the analog to digital data. While this increases the gain of the displayed image at low light levels, it also reduces the signal-to-noise at the low light levels. Because shot noise at higher illumination makes very fine gray-scale resolution less usable, this method compresses bright light levels and sacrifices information. For example, using this method, an imaging system with a 12-bit A/D converter and a 12-bit sensor may, in practice, generate only 10 bits of useful data.

In a second common method, an automatic gain control (AGC) circuit is included prior to the A/D converter. While this method is useful for shifting between bright scenes and dim scenes, it cannot effectively handle a scene with both bright and dim areas simultaneously.

A third method manipulates the pixel outputs toward a logarithmic response. While this extends the dynamic range, the signal-to-noise (SNR) level at any particular point in the response curve remains limited, since the number of photons captured at each light level is fundamentally unchanged. Improvement of SNR requires an increase in the number of photons captured. Further, because this method requires adjustments on a pixel-to-pixel basis, objectionable artifacts may arise due to pixel-to-pixel non-linearity. More specifically, such non-linearities vary from pixel-to-pixel because of device fabrication variations, for example, implant variations, oxide thickness variations, variations in bias line resistances, and the like, and/or because of the operation of the pixel transistor in a non-linear region.

A fourth method first captures an image using a short integration time, and a second image using a relatively longer integration. The two images are subsequently combined with the aid of software that takes the bright data from the image taken using a short integration image, and the dim data taken using a relatively longer integration image. This method takes longer to capture an image, and the procedure to effectively combine the two images is difficult and error-prone.

FIG. 1A shows two pixels 10 and 12 of a typical CCD 100. Each pixel is a metal oxide semiconductor (MOS) structure that includes, in part, a conductive doped polysilicon layer 116 formed over a silicon substrate 118 and separated from the substrate by an insulating material 114, such as silicon dioxide. A storage area, or a potential well 108 (to use a water analogy), is formed when a voltage 106 is applied to an electrode 124 deposited over insulating material 114. As light strikes a CCD pixel (sensor), the impinging photons create electron-hole pairs, and the created electrons 112 are stored in well 108. Electrons 112 are confined under electrode 124 within the potential well 108 having barrier height 120. In the example of FIG. 1A, Pixels 10 and 12 are shown as being exposed to the same light density.

Referring to FIG. 1B, pixel 10 is shown as being exposed to a relatively brighter light than pixel 12. Accordingly, after well 108 fills up with electrons, excess electrons 132 begin to spill into adjacent well 134 of pixel 12. The spillover of the excess electrons results in a white streak in the image, and is referred to as blooming.

FIG. 1C shows a pixel 150 with an anti-blooming drain 152, as known in the prior art, adapted to alleviate the spillover problems associated with pixels 10 and 12 of FIG. 1A. The anti-blooming drain 152 is used to from a well 110 whose depth 122 (barrier height) is controlled via a voltage 102 applied to drain 152. The top 154 of well 108 is defined by the voltage 104 applied to gate electrode 126 which is disposed between the pixel electrode 124 and the anti-blooming drain electrode 152. In normal operation, anti-blooming well 110 captures the excess electrons 132 thus inhibiting excess electrons 132 from spilling over to an adjacent pixel. The voltage 102 applied to anti-bloom drain is typically set to the value at which the pixel saturates with charge.

BRIEF SUMMARY OF THE INVENTION

In accordance with the present invention, a customizable and user-definable voltage-time curve (i.e., a time-varying voltage) is applied to the antibloom structure of an image sensor. The voltage-time curve defines a number of charge integration periods during each of which a different a voltage is applied to the antibloom structures. Charges generated in response to a low level light are fully captured, whereas charges generated in response to a relatively higher level light spill over in a controlled manner. The resulting pixel response to varying levels of light is equivalent to a gamma-corrected behavior. Accordingly, the image sensor's response results in higher gains at low light levels and progressively lower gains at the higher light levels. Therefore, a wider effective dynamic range is attained.

DETAILED DESCRIPTION OF THE INVENTION

In accordance with one embodiment of the present invention, a customizable and user-definable voltage-time curve is applied to the antibloom structure of an image sensor, and the resulting pixel response to varying levels of brightness is equivalent to gamma-corrected behavior. More specifically, the invention takes advantage of the ability of an image sensor having an anti-blooming drain and specialized timing circuitry to skim off excess charge at a pixel once the level has exceeded a definable threshold. In particular, by varying the voltage on the antibloom drain during light integration, pixel charges generated in response to a low level light are fully captured, whereas pixel charges generated in response to a bright light spill over in a controlled manner. Therefore, a wider effective dynamic range is attained.

The following description is provided with reference to an imaging system with a charge coupled device (CCD) based image sensor. It is understood, however, that the present invention equally applies to any image sensor, such as an electron multiplied CCD ("EMCCD"), CMOS and other linear and two-dimensional sensors which have an antibloom structure. Further, the antibloom structure may take the form of either lateral or vertical overflow drain.

Figure 1A:
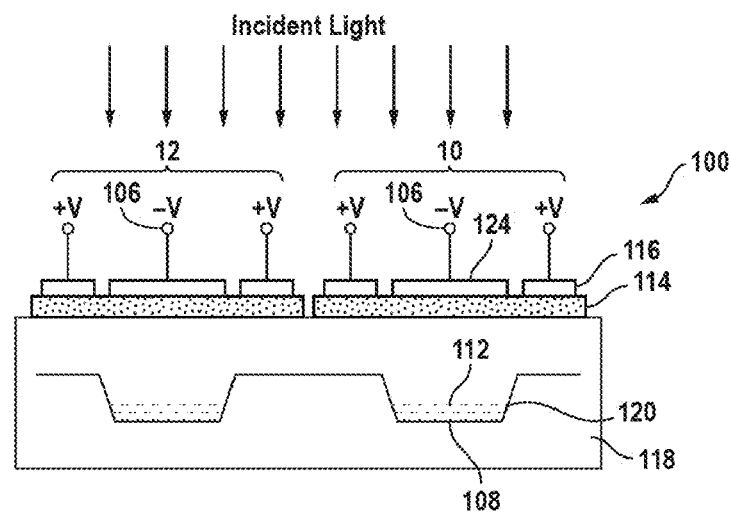
FIG. 1A is a cross sectional view of a pair of pixels of a charged couple device (CCD), as known in the prior art.
Figure 1B:
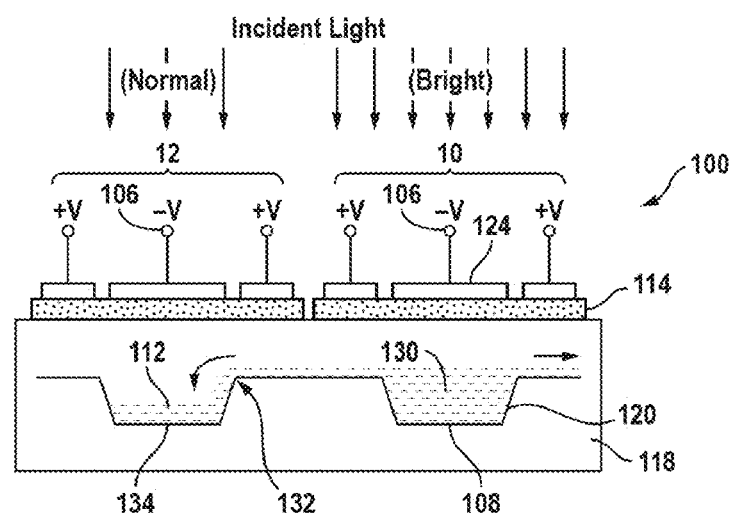
FIG. 1B shows the variations in the potential wells of the pair of pixels of FIG. 1A when one of these pixels is more brightly lit than the other, as known in the prior art.
Figure 1C:
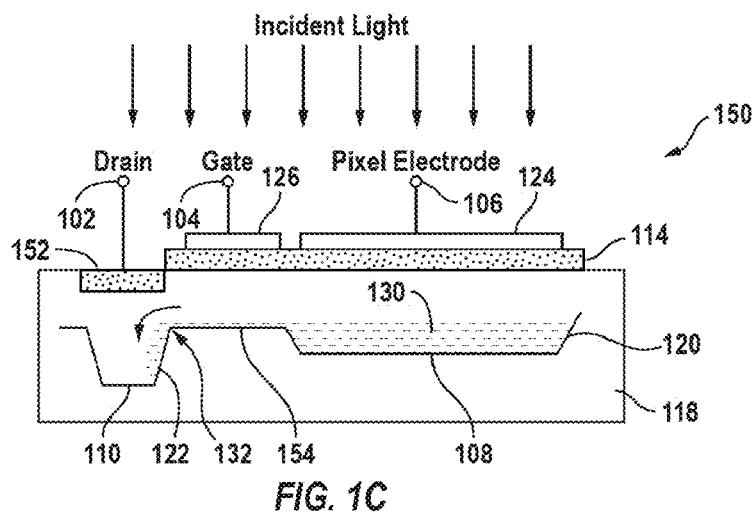
FIG. 1C is a cross sectional view of a CCD pixel with anti-blooming drain, as known in the prior art.
Figure 2A:
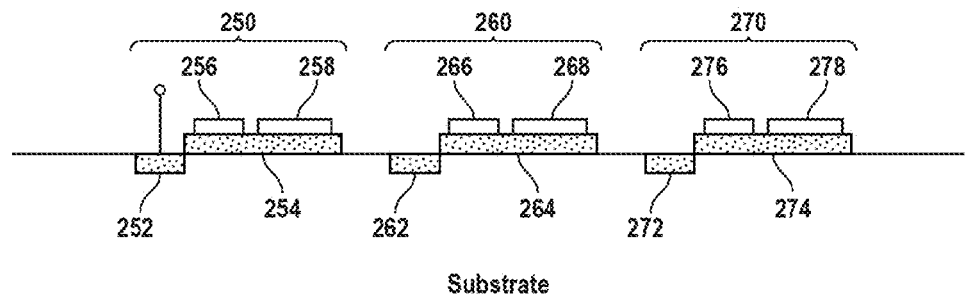
FIG. 2A shows a multitude of pixels exposed to various light levels.

FIG. 2A shows three pixels 250, 260 and 270 with respective anti-blooming drains 252, 262, and 264. Pixel 250 is assumed to be exposed to a high level, very bright light. Pixel 260 is assumed to be exposed to a medium level light, and pixel 270 is assumed to be exposed to a low level, relatively dim light. In accordance with the present invention, a voltage-time curve is applied to the antibloom electrodes of the sensors to produce pixel response that covers a wide range of intensity spanning the three light intensities to which pixels 250, 260 and 270 are exposed. In particular, the response results in high gains at low light levels, medium gain at medium light levels, and lower gains at high light levels.

Figure 2B:
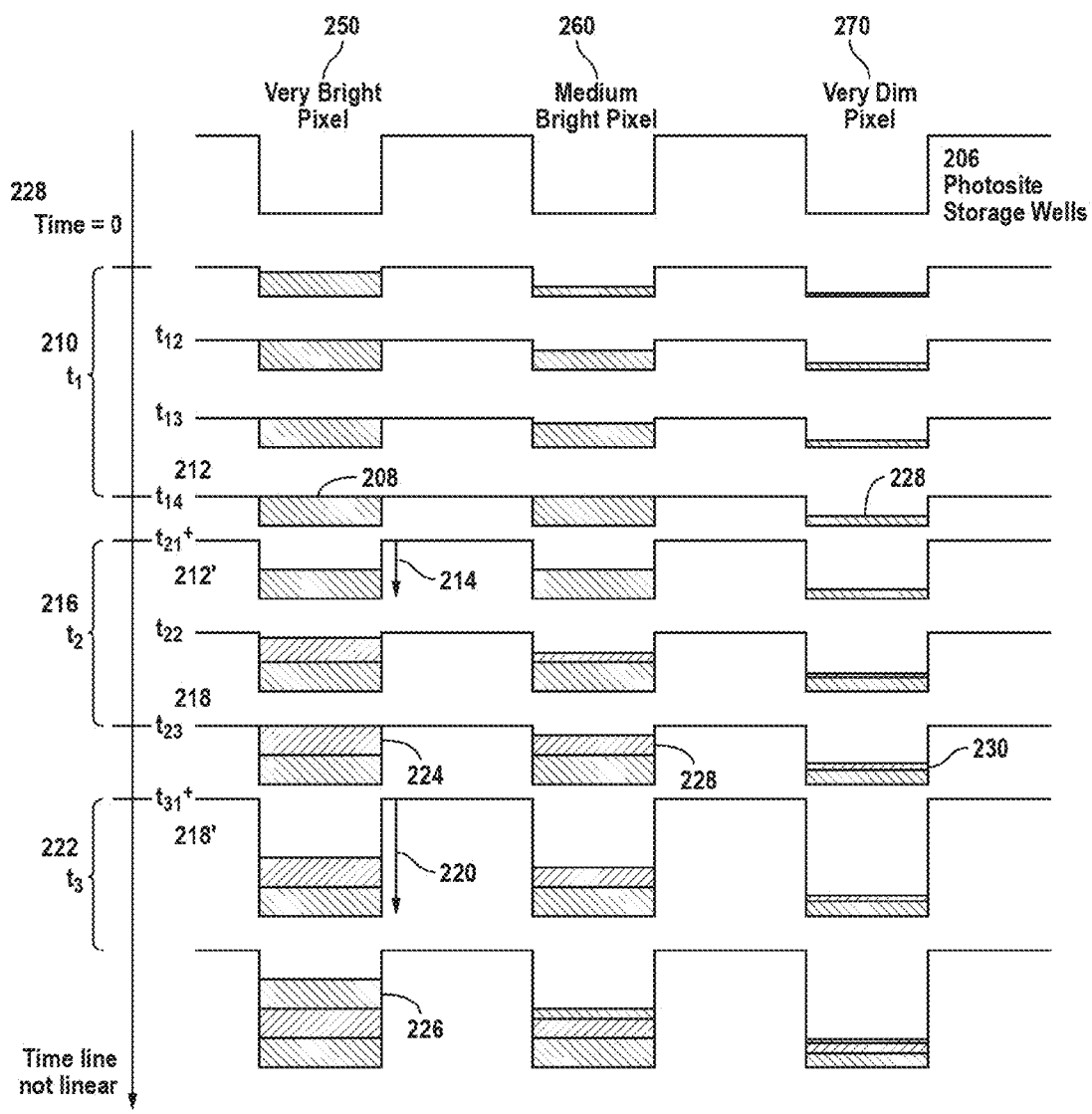
FIG. 2B shows an exemplary potential barrier heights and integrated charges associated with the pixels of FIG. 2A, in accordance with one embodiment of the present invention.

The invention is described with reference to the following example. Assume that the voltage applied to the anti-blooming drains 252, 262 and 272 is selected such that charges spill into these anti-blooming drains when their associated pixels are more than, for example, ¼ of their full capacity. The imager integrates light for time $t_1$. As seen in FIG. 2B, pixel 250 is shown as reaching the ¼ full capacity level 208 at the end of time period $t_{12}$, and pixel 260 is shown as reaching this ¼ full capacity level 208 at the end of time $t_{14}$. Accordingly, for pixels 250 and 260, excess charges begin to spill into their respective anti-blooming drains at the end of time periods $t_{12}$, and $t_{14}$. However, dimly lit pixels, such as pixel 270 continue to collect charges 228 without any spillover effects by the end of $t_1$.

For the next time period $t_2$ of continued integration time, the anti-blooming voltage is selected such that charges spill into these anti-blooming drains when their associated pixels are more than, for example, ½ of their full capacity. During this period, pixel 250 is shown as reaching its ½ full capacity 224 at time $t_{23}$, therefore, charges spill over from pixel 250 to its associated anti-blooming drain. At the end of time period $t_2$, pixels 260 and 270 reach maximum levels of 228 and 230 both of which are less than half of full capacity. Accordingly, no charges spill over from pixels 260 and 270 to their respective anti-blooming drains. For the last shown period $t_3$ of continuing integration time, the anti-blooming electrode voltage is selected such that charges spill into the anti-blooming drains when their associated pixels reach full capacity 220. As seen from FIG. 2B, during time period $t_3$, none of the pixels 250, 260 and 270 overflow.

Figure 3:
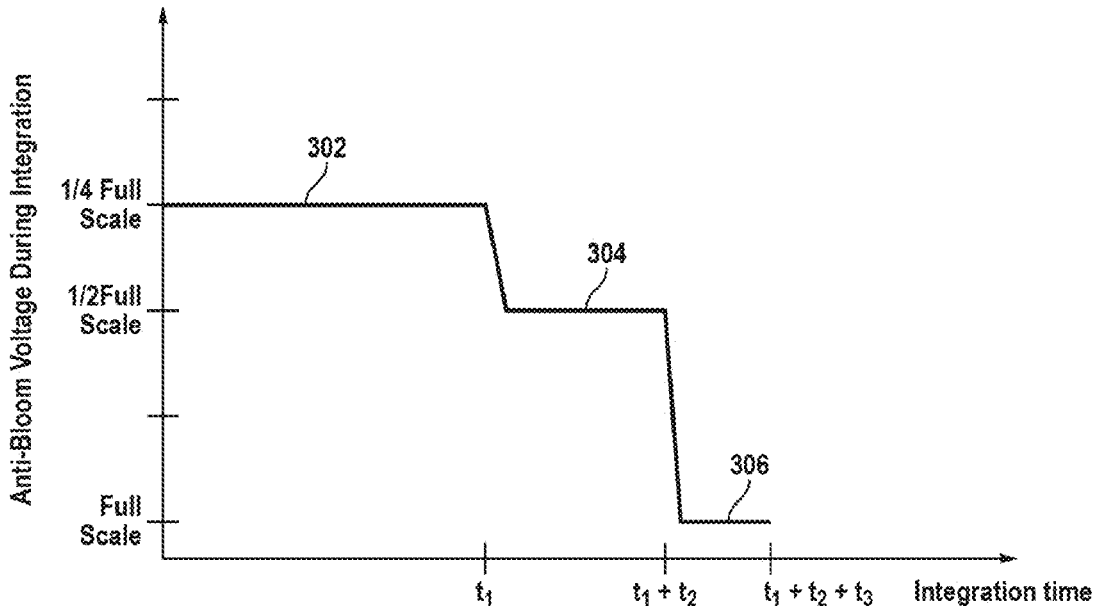
FIG. 3 shows the time dependence of voltages applied to the anti-blooming drain terminals of the pixels shown in FIG. 2A.

FIG. 3 shows an exemplary voltage pattern applied to the terminals of anti-blooming drains 252, 262 and 272. For the period of ($t_1$–0), the anti-blooming drain electrode voltage is set to a voltage 302 that is required to establish one quarter full well capacity. Between the times $t_1$ and ($t_1+t_2$), the anti-blooming drain electrode voltage is set to a voltage 304 required to establish half of full well capacity. Between the times ($t_1+t_2$), and ($t_1+t_2+t_3$), the anti-blooming drain electrode voltage is set to a voltage 306 that is required to establish full well capacity. In FIG. 3, a higher applied voltage results in a lower full well setting.

Referring to FIGS. 2 and 3, although the charge integration is performed over three time periods, it is understood that charge integration may be performed over any number of time periods N, where N is an integer greater 1. Furthermore, the duration of each period may also be selected by the user. For example, the second integration time ($t_2-t_1$) may be selected to have the shortest duration, while, for example, a fifth integration time ($t_5-t_4$) (not shown) may be selected to have the longest duration. In one embodiment, some of the integration periods may be equal. Moreover, the voltage level applied to the anti-blooming drains during one integration period, as selected by the user, may be equal to any fraction of the full well voltage. Thus, any shaped voltage-time curve may be defined, generated, and applied to result in a pixel response that is effectively gamma corrected. The non-linear gain of the user-definable voltage-time curve requires that all portions of the curve have positive slope. This is typically what is desired in imaging applications because it corresponds to the response of the human eye, and also takes advantage of the fact that shot noise increases with higher light levels as the square root of the light level itself. The positive slope further means that higher gains may result at low light levels and progressively lower gains may result at the higher light levels. Furthermore, several voltage-time correction curves can be generated and used as required depending on the specific applications. Further, in accordance with the invention, because the user-definable voltage time curve may take any shape as long as all portions of the curve have positive slope, the sensor response may not necessarily be strictly exponential as typically results from application of conventional post-processing corrections.

Figure 4:
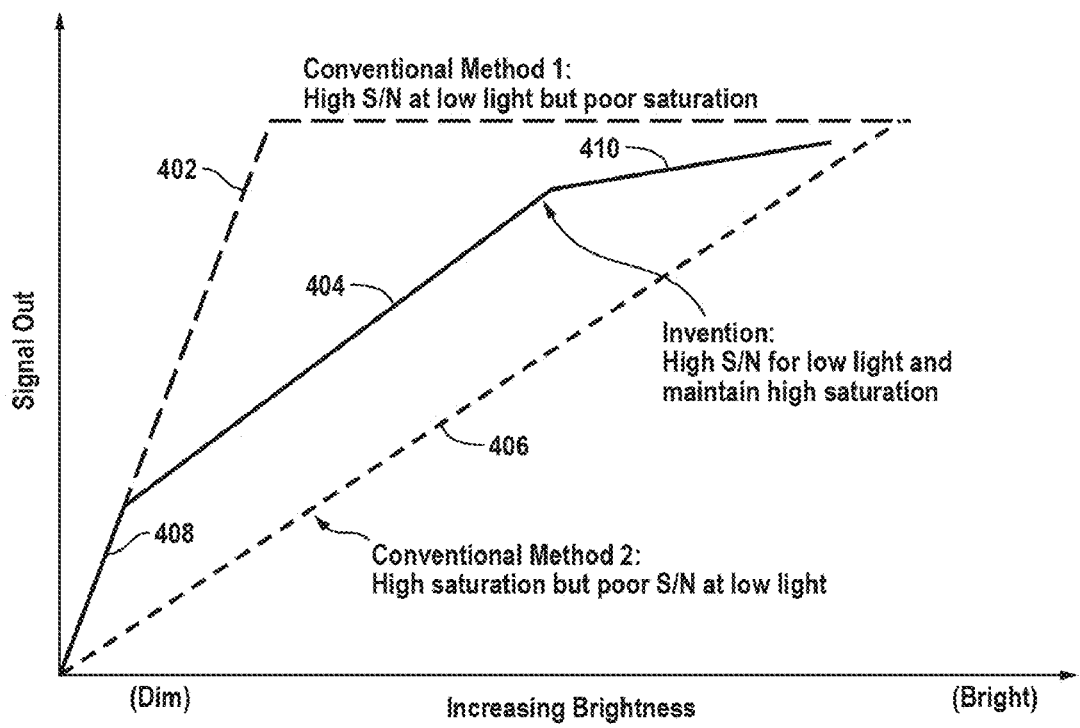
FIG. 4 shows, in part, an image sensor's response resulting from application of several voltage-time curves in accordance with one exemplary embodiment of the present invention.

FIG. 4 shows a pair of light response curves 402 and 406 (illustrated using dash lines) generated using conventional correction methods, and a light response curve 404 (illustrated using solid lines) generated in accordance with the present invention. Light response curve 402 represents a typical response of a sensor with conventional corrections applied to enhance the signal-to-noise ratio at low brightness. In this case, response to very bright light results in saturated pixels, which would be indistinguishable from other slightly brighter or dimmer pixels in the scene. Alternatively, if gain corrections are applied to keep pixel response to very bright light within the range of the sensor and A/D converter, as illustrated by curve 406, then the details in the dimly lit areas are reduced. The response curve 404, in accordance with the present invention in which a user-definable voltage-time curve is applied to the sensor's antibloom drains, the bright areas 410 are distinguishable from one another, while the signals associated with the dim areas 408 are sufficiently high to maintain the desired details.

The present invention is equally applicable to color images. Normally, a color image is formed by taking successive exposures each with a different optical filter (red, green blue). Responses in film emulsions are different for each of the three colors. Thus, each color requires a specifically tailored gamma correction. In accordance with the present invention, gamma corrected responses may be optimized for each of the colors by defining user-definable voltage-time curves for each of the colors, which are then applied to the antibloom electrodes of the sensor sequentially during the red, green, blue capture sequences. In the case of a single-chip color camera with on-chip color filters (for example, Bayer pattern filters), the non-linear response allows for the capture of bright colors without saturation, while still maintaining signal integrity in the dark areas. Red image data is frequently much brighter than blue data due to the color temperature of most natural light sources and the higher quantum efficiency of silicon in the longer wavelengths (for the case of detectors that are silicon-based).

By applying a non-linear transfer function at the time the photons are captured, the present invention achieves a wider effective dynamic range than would be otherwise provided by the hardware. More specifically, since in accordance with the present invention data is compressed at the higher illumination levels, a larger input data range fits within the hardware A/D converter range. The compression does not generally result in loss of data integrity because at the higher illumination levels, the shot noise is higher, and therefore the granularity of gray-scale quantization may be lower.

Assume, for example, the low light levels may be digitized so that, e.g., 20 electrons, which is approximately the noise floor of a camera system in darkness, represents one A/D count. However, assuming that the camera has full well size of 200,000 electrons, the noise floor would be approximately $[200,000]^{1/2}$ or 447 electrons when the camera pixels are operated at high light levels (near full scale). This means that at higher light levels one A/D count may equal to approximately 400 electrons, which is a lower granularity of gray-scale quantization than at relatively lower light levels. Lower granularity means availability of gray-scale levels for more data. According to the present invention, the gain is changed as the light level moves from low to high, and therefore a wider effective dynamic range is achieved. For example, compression of a 16,000:1 dynamic range, which normally requires a 14-bit A/D converter, is achieved via a 12-bit A/D converter.

The present invention applies to imaging systems such as digital cameras requiring wide dynamic range within the same scene. The intra-scene dynamic range is extended without any change to the pixel architecture or to the A/D converter. The present invention requires no post-processing software. Furthermore, the various segments of the user-definable voltage-time curve yield a single composite image without the need to combine multiple images together to form a composite image. The image is captured within one integration time, thus maximizing frame rate. The present invention may be applied to inspection and testing system where imaging is used. It may also be applied to digital X-ray systems, surveillance imaging applications, film scanning, night vision systems, automotive applications, and the like.

The above embodiments of the present invention are illustrative and not limiting. Various alternatives and equivalents are possible. The invention is not limited by the type of image sensor or imaging device. The invention is not limited by the number of integration periods. Nor is the invention limited to any order or duration of each integration period. The invention is not limited to any particular values of voltages or times forming the voltage-time curve applied to the antibloom drains. Other additions, subtractions or modifications are obvious in view of the present disclosure and are intended to fall within the scope of the appended claims.

What is claimed is:

1. A method of invoking a response in an imaging device having disposed therein a sensor, the method comprising:
    applying a user-defined time-varying voltage according to a non-linear profile to anti-blooming electrodes of the sensor thereby to define a plurality of charge integration periods, each charge integration period having a unique profile;
    exposing each of a different one of a plurality of pixels disposed in the sensor to a different one of a plurality of light levels while varying voltage to the anti-blooming electrodes according to the unique profiles; and
    integrating charges during each of the plurality of integration periods thereby to cause the imaging device to invoke a non-linear response to modify an image captured by the imaging device.

2. A method of invoking a response in an imaging device for modification of an image captured by the imaging device, the method comprising:
    applying a first voltage to anti-blooming drain terminals disposed in the imaging device during a first time period;
    applying a second voltage differing from the first voltage to the anti-blooming drain terminals during a second time period;
    exposing a first pixel to a first light level during the first and second time periods while applying the first voltage;
    exposing a second pixel to a second light level during the first and second time periods while applying the second voltage, said second light level being greater than said first light level; thereafter
    integrating charges generated during the first and second time periods; and
    causing the imaging device to invoke a response in accordance with the integrated charges.

3. The method of claim 2 further comprising:
    applying a third voltage to the anti-blooming drain terminals during a third time period;
    exposing a third pixel to a third light level during the first, second, and third time periods while applying the third voltage, said third light level period being greater than said second light level; thereafter
    integrating charges generated during the third time period; and causing the imaging device to invoke the response in accordance with the integrated charges.

4. The method of claim 3 wherein said first time period is longer than said second time period.

5. The method of claim 4 wherein said third time period is longer than said second time period.

6. The method of claim 4 wherein said first voltage is selected so as to impede spillover of charges generated by the first pixel upon the termination of the first time period.

7. The method of claim 6 wherein said first voltage is selected so as to enable spillover of charges generated by the second and third pixels upon the termination of the first time period.

8. The method of claim 7 wherein said second voltage is selected so as to impede spillover of charges generated by the first and second pixels upon the termination of the second time period.

9. The method of claim 8 wherein said second voltage is selected so as to enable spillover of charges generated by the third pixel upon the termination of the second time period.

10. The method of claim 9 wherein said third voltage is selected so as to impede spillover of charges generated by the first, second and third pixels upon the termination of the third time period.

11. The method of claim 3 wherein said first time period is shorter than said second time period.

12. The method of claim 11 wherein said third time period is shorter than said second time period.

13. The method of claim 3 wherein said first voltage is greater than said second voltage.

14. The method of claim 3 wherein said second voltage is smaller than said third voltage.

15. The method of claim 2 wherein said imaging device is disposed in a digital X-ray system.

16. The method of claim 2 wherein said imaging device is disposed in a surveillance system.

17. The method of claim 2 wherein said imaging device is disposed in a film scanning system.

18. The method of claim 2 wherein said imaging device is disposed in a night vision system.

* * * * *